Oct. 9, 1923.
C. LONG
1,470,384
COMBINATION CATTLE AND HOG WATERING FOUNTAIN
Filed April 10, 1922
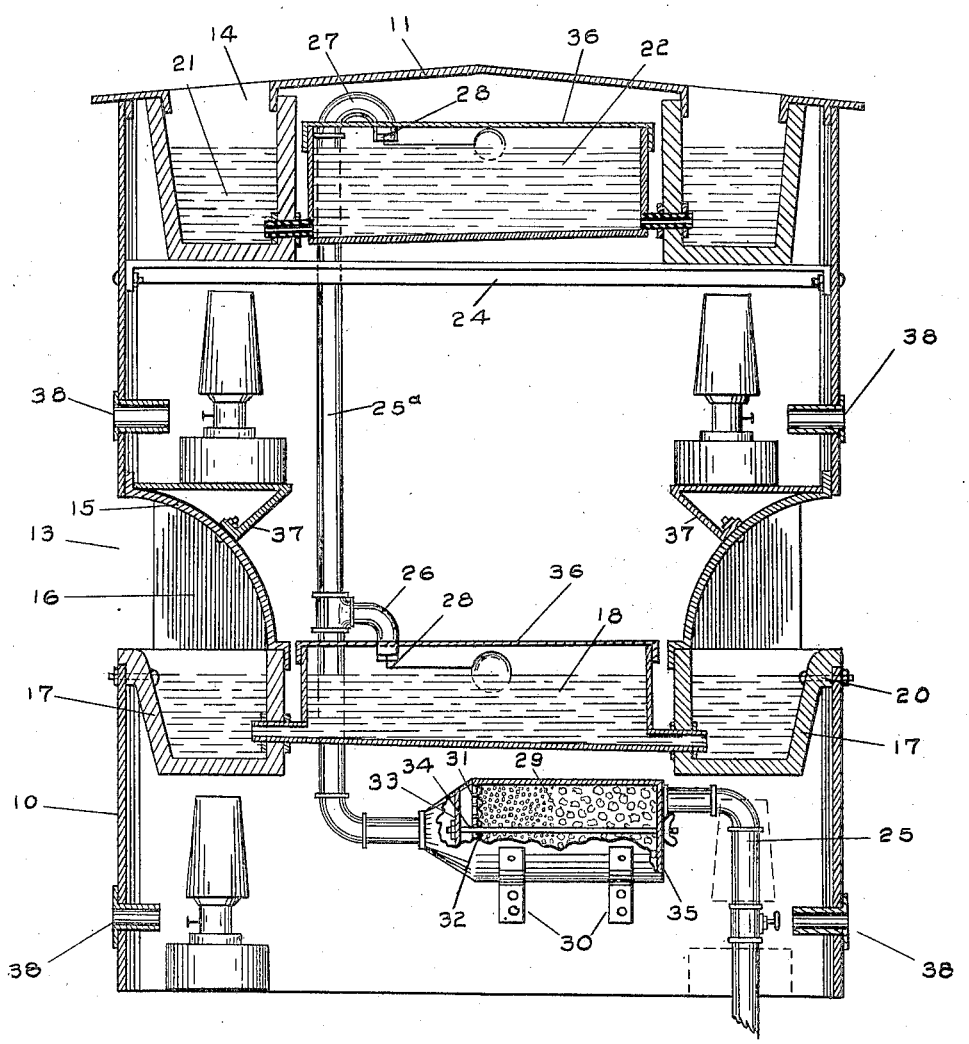
CHARLIE LONG   INVENTOR.
BY
Emil F. Lang ATTORNEY.

Patented Oct. 9, 1923.

1,470,384

UNITED STATES PATENT OFFICE.

CHARLIE LONG, OF LINCOLN, NEBRASKA.

COMBINATION CATTLE AND HOG WATERING FOUNTAIN.

Application filed April 10, 1922. Serial No. 551,077.

*To all whom it may concern:*

Be it known that I, CHARLIE LONG, a citizen of the United States, residing at Lincoln, in the county of Lancaster and State of Nebraska, have invented certain new and useful Improvements in Combination Cattle and Hog Watering Fountains, of which the following is a specification.

My invention relates to combination cattle and hog watering fountains, and some of its objects are to keep the fountain automatically supplied with fresh water from any source of water under pressure, to provide a fountain which can be easily and quickly cleaned, and to provide a heating system which will prevent freezing of the water.

Having in view these and other objects which will appear in the description, I will now refer to the drawings, in which The figure is a sectional view of the combination fountain, part of the filler being broken away.

In the drawings, numeral 10 refers to the casing which is covered by a lid 11. The lid 11 is preferably cone shaped and is made removable in order to give access to the interior. The casing is provided with openings 13, preferably two in number, and in the lid there are similar openings 14. The openings 13 are backed by sheet metal strips 15 which are designed to prevent the animals from getting access to the interior. At the sides of the openings 13 are similar strips of metal 16 and for a similar purpose.

As shown, the arrangement consists of two drinking cups 17 connected by a trough 18. The trough has a gradual but distinct slope from one end to the other at its bottom, and tubes or pipes 19 pass out from the trough near its bottom to the drinking cups 17. The purpose of the sloping bottom is of course to cause all of the mud and litter to be carried to the lower of the two outlets, thus materially reducing the work of cleaning the fountain. The cups 17 with their trough are assembled with the casing by means of bolts 20 passing through aligned apertures in the casing and the walls of the cups, but any other suitable fastening means may be employed if desired. In assembling these parts the back 15 and the sides 16 are lapped over the edges of the cups to make the joints as tight as possible, so as to reduce as much as possible the amount of trash which is carried in by the animals and blown in by the wind.

The drinking fountain for the larger animals is placed in the top of the casing. Except for slight differences in the dimensions, this drinking fountain is identical with the lower fountain, and consists of drinking cups 21, a trough 22, and connecting pipes 23, the trough 22 having a sloping bottom similar to that of the trough 18 and for a similar purpose. The edges of the openings 14 in the cover 11 are lapped over the edges of the cups 21 to prevent trash from entering the interior of the casing. To support the upper drinking fountain I provide two angle iron beams 24 (only one of which is shown), and these beams have downturned ends which serve as hooks. I rivet I members on the interior of the casing to cooperate with the hook ends of the beams. In this way the beams can be easily put into place or removed, but I do not desire to limit myself to this specific form of fastening means.

For supplying water to the troughs, I avail myself of the pressure supply system found on many farms. This system may be a gravity system connected with an overhead tank or with a pond at a higher level, or it may be a system depending on compressed air to force the water through the pipes. The water from the pressure system is carried into the interior of the casing through the pipes 25 and $25^a$. The pipe $25^a$ is provided with branches 26 and 27 for conducting the water into the troughs 18 and 22 respectively, the outlets of the respective branch pipes being within the troughs. For controlling the flow of water and for preventing the water from overflowing, I place float valves 28 at each of the openings. These float valves may be of any desired type or form, and are simply designed to maintain the water in the troughs and drinking cups at a constant level.

Water taken from many of the sources of water on the farm, such as a stock tank or a pond in the pasture, is apt to contain bits of straw and much vegetable growth and to carry these and other impurities into the fountain. Such impurities tend to clog up the float valves, and to prevent this I connect a filter 29 to the pipes 25 and $25^a$. The filter is supported on the wall of the casing by means of supports 30 riveted or otherwise secured to the casing, and it consists of two parts: a cylindrical body member at the inlet end and a funnel member at the outlet end. At the junction of the two parts is a perforated metal disc 31 and a piece of gauze of rather fine mesh. The gauze disc 32 is removable for cleaning purposes. The cylindrical part of the filter is filled with sand, gravel, charcoal, or any other suitable filtering materials, and if desired germicide may be introduced into the drinking water by means of the filter. Individual circumstances will determine the most desirable filtering materials and germicides or combinations thereof.

A bar 33 is secured to the funnel portion of the filter and centrally connected to this bar is a rod 34 which extends through the entire cylindrical part of the filter. The outer end of the rod 34 is screw threaded and carries a wing nut to hold the cover 35 in place. By removing the cover, the filter can be easily discharged, cleaned, and refilled. The pipe 24 is provided with a valve 25' to facilitate this operation. Reference is here made to my copending application, Serial Number 542,678, filed March 10, 1922, in which a similar form of filter is described in greater detail. In that case, the filter is cylindrical throughout, but I have found that a cylindrical filter in a low pressure supply system will not feed the water rapidly enough to supply the animals with drinking water, and I have found that the funnel end which is clear for the flow of water, permits of a more rapid passage of the water through the filter.

I provide removable lids 36 for both of the troughs 18 and 22. These protect the contents of the troughs from the trash and dirt in the air. To prevent freezing of the water, I place lamps under each of the drinking cups. The lower lamps rest on the ground, and for the upper lamps I provide bracket supports 37 which are secured to the casing. One or two doors in the casing, similar to that described in my copending application above referred to, provide access to the lamps for the purpose of lighting, cleaning, or refilling them. Adjacent each lamp is an air vent 38 protruding inwardly from the casing to a point adjacent the burner.

The fountain as described is particularly useful in a barn yard or pasture containing mixed live stock. The cups 17 are placed at such a height as to be within convenient reach of the smaller stock such as hogs and sheep and the larger fowls like geese and turkeys. The cups 21 are placed at a convenient level for horses and cattle. It will readily be seen that I have designed a drinking fountain which requires the minimum of care. The water is supplied automatically from a source under pressure, thus requiring no filling by hand. The accumulations of mud and trash in the cups tend to seek the lower level, thus making it necessary to clean out only one of the pair of drinking cups. The filter because of its construction and mounting, is easily and quickly taken apart and cleaned. The whole apparatus is automatic, and requires only a moment's attention each day in the cleaning of the cups, and a little extra attention at comparatively long intervals in renewing the filter.

Having thus described my invention, its uses and its advantages, what I believe to be new and desire to secure by Letters Patent of the United States is:—

A combination drinking fountain for live stock including a casing, openings at diametrically opposite positions in said casing, drinking cups secured to the casing on the inside thereof and adjacent said openings, a trough connecting said cups, said openings having curved walls for closing the top, back, and sides of the recess above each drinking cup, a cover for said casing, drinking cups in contact with and immediately beneath said cover, openings in said cover above said last named drinking cups, a trough connecting said last named drinking cups, said last named drinking cups and trough being supported on a removable shelf which is secured at its ends to said casing, both of said troughs having sloping bottoms, said sloping bottoms being so formed that the troughs may be completely drained by gravity, horizontal shelves secured to the top portions of said curved walls, said horizontal shelves being adapted to support lamps immediately beneath said second named drinking cups, means for supplying all of said drinking cups and troughs with water from a water supply system under pressure, and means for maintaining the water at a constant level in each of said troughs.

In testimony whereof I affix my signature.

CHARLIE LONG.